United States Patent
Ygodkin

(10) Patent No.: US 8,213,750 B2
(45) Date of Patent: Jul. 3, 2012

(54) METHOD AND DEVICE FOR SUPPRESSING CROSS-COUPLING COMPONENT IN MULTIMODE FIBERS

(75) Inventor: Roman Ygodkin, Oxford, MA (US)

(73) Assignee: IPG Photonics Corporation, Oxford, MA (US)

( * ) Notice: Subject to any disclaimer, the term of this patent is extended or adjusted under 35 U.S.C. 154(b) by 471 days.

(21) Appl. No.: 12/469,266

(22) Filed: May 20, 2009

(65) Prior Publication Data

US 2010/0296765 A1  Nov. 25, 2010

(51) Int. Cl.
*G02F 1/035* (2006.01)
(52) U.S. Cl. .......................................................... 385/3
(58) Field of Classification Search ................... 385/1–3
See application file for complete search history.

(56) References Cited

U.S. PATENT DOCUMENTS

| | | | |
|---|---|---|---|
| 5,774,484 A | 6/1998 | Wyatt | |
| 5,796,891 A | 8/1998 | Poustie | |
| 5,999,673 A | 12/1999 | Valentin | |
| 6,278,523 B1 * | 8/2001 | Gorecki | 356/450 |
| 2008/0193080 A1 * | 8/2008 | Cheben et al. | 385/28 |
| 2011/0188800 A1 * | 8/2011 | Futami | 385/3 |

OTHER PUBLICATIONS

Erik Bochove, Non-Linear Refractive Index of a Rare-Doped FiberLasers, OL/vol. 29, No. 20, Oct. 15, 2004.
Emmanuel Desurvire, EDFAs, Devices and System Development, Chapter 1, p. 19, Equation 1.50.
Tim A. Birks, The Acousto Opticeffect in SM Fiber Tapers & Couplers, Journal of Lightwave Techonology, vol. 14, No. 11, Nov. 1996 Equation 17, p. 2522.

* cited by examiner

*Primary Examiner* — Eric Wong
(74) *Attorney, Agent, or Firm* — Yuri Kateshov; Timothy J. King

(57) ABSTRACT

A laser system includes a multimode fiber (MMF) receiving a single-mode input beam and a mechanical oscillator coupled to the MMF. The oscillator is operative to modulate a phase of interference wave by periodically extending the fiber total length at such a frequency that a cross-coupling coefficient between fundamental and at least one high-order modes is substantially minimized.

16 Claims, 3 Drawing Sheets

FIG. 1
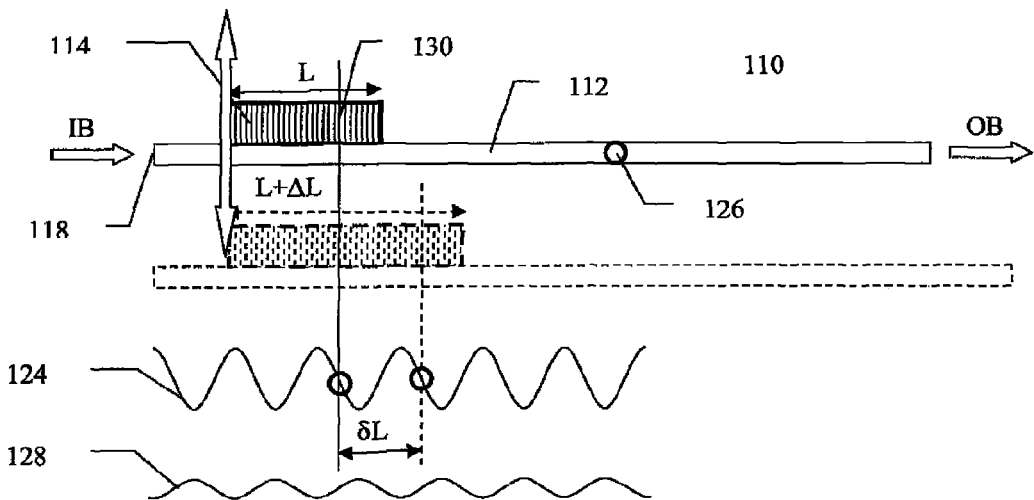
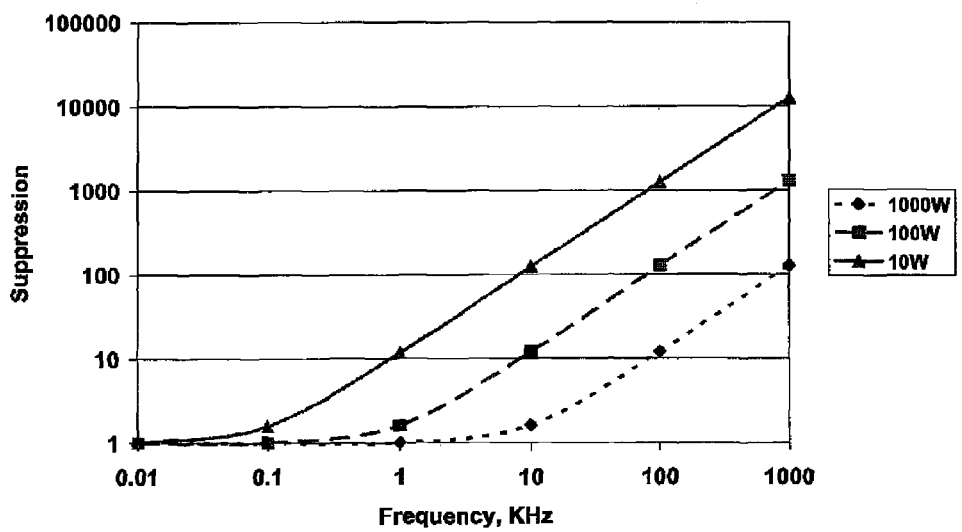
FIG. 2

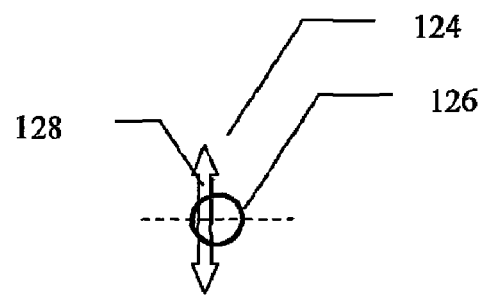
FIG. 3
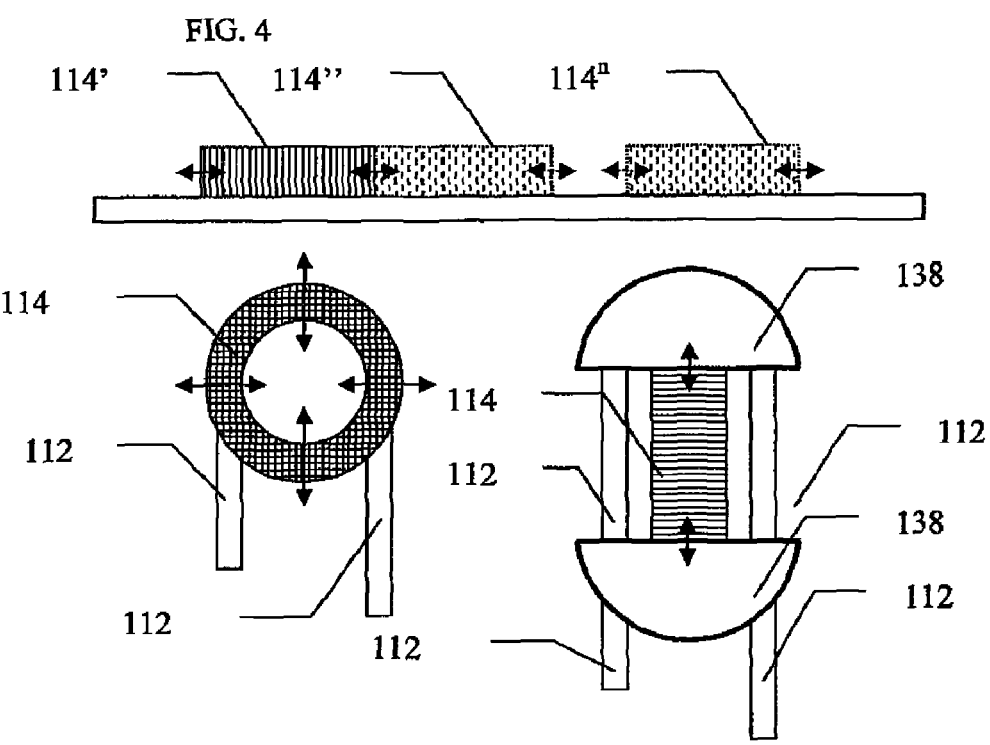
FIG. 4
FIG. 6  FIG. 5

METHOD AND DEVICE FOR SUPPRESSING CROSS-COUPLING COMPONENT IN MULTIMODE FIBERS

BACKGROUND OF THE DISCLOSURE

1. Field of the Disclosure

The present disclosure relates to a fiber laser system configured with one or more multimode fibers each of which is configured so that the coupling between a fundamental mode and one or more high-order modes propagating along the multimode fiber is substantially minimized.

2. Prior Art Discussion

Light propagating along a optical fiber may have one or more propagation paths commonly referred to as modes. An optical fiber may support a single, fundamental mode or more than one mode depending on physical and geometrical characteristics of the fiber. As a consequence, a fiber configured to support only a fundamental mode is referred to as a single-mode (SM) fiber, whereas a fiber guiding more than one mode is a multimode (MM) fiber.

As known, in a MM active fiber, i.e., the fiber provided with a gain medium doped with rare-earth elements, the modes are amplified. In addition, the modes tend to couple to one another. The coupling effect is particularly pronounced when the gain coefficient of HOM is at most equal to or less than the gain coefficient of the fundamental mode, which may occur when the doped profile is substantially close to the intensity of the fundamental mode. The mechanism of mode coupling has been studied for a long time and is rather complicated. In very broad terms, the periodic modulation of light intensity along the fiber leads to the modulation of the refraction index, which in turn may create the coupling of modes. In large degree, the mode coupling is a result of the change of the medium's refractive index due to excitation of electrons which leave a ground energy level for higher ones.

Regardless of the complexity of the mode-coupling theory, this concept can be easily understood if described in terms of quality of light. As the modes couple to one another, the total power of single mode light beam coupled into the MM fiber will be distributed among two or more modes, one of which is a fundamental mode carrying the major part of the light power. If a MM fiber is configured to radiate a high quality beam, all it means that the total power should be concentrated in the fundamental mode. Accordingly, as the power is drawn from the fundamental mode, which happens when at least one higher-order mode is coupled to the fundamental mode, the "useful" power reduces. Thus, the desired power of the light beam radiated from a MM optical fiber can be achieved when the coupling between the fundamental and one or more high-order modes is substantially eliminated.

One may ask why bother with MM fibers if SM fibers, which are not associated with a cross-coupling phenomenon, can be used. Many applications of fiber laser systems require high pump powers. High pump powers, however, cause serious problems associated with the design of fiber systems. For example, with higher powers comes a problem associated with nonlinear effects which, for a few notable exceptions, are highly undesirable. To raise the threshold for nonlinear effects in a fiber, it is desirable to increase the core diameter. In other words, to avoid the presence of nonlinear effects at relatively high pump powers, the effective mode area should be as great as possible. This requirement, however, can be better met by MM fibers. Accordingly, the use of MM fibers, characterized by a relatively large core diameter, becomes practically a norm in high power fiber laser systems. Thus, in some applications of MM fibers requiring a high quality output, the mode-coupling should be suppressed.

A need, therefore, exists for providing a method for minimizing the coupling between fundamental and higher order modes in conventional multimode fibers while concentrating the majority of the total input power in a fundamental mode.

A further need exists for a high power fiber system configured in accordance with the disclosed method and characterized by high quality powerful output light beam.

SUMMARY OF THE DISCLOSURE

These needs are met by the disclosed method and system. In general, the disclosed method and apparatus allow for demodulating an interference wave, formed in a MM fiber, which is selected from the group consisting of an active MM fiber and a passive MM fiber and a combination of these, in response to launching a light input beam, in such a way that a cross-coupling coefficient is substantially decreased and may be completely eliminated. The term "interference wave" means a result of beating between a fundamental mode and one or more high-order modes (HOMs) which is represented by nonuniform intensity in a transverse cross-section and periodic intensity along the fiber.

The disclosed method provides for modulating a phase of interference wave in such a way as to substantially reduce and even completely eliminate a cross-coupling coefficient between fundamental and high order modes. In particular, the disclosed method includes modulating the length of a MM fiber at the predetermined frequency at which the length is periodically increased and decreased. The change of the fiber length causes the phase modulation of the of interference wave.

The interference wave is associated with the inversion which is represented by a periodic wave as well. The inversion process is "a state of a medium where a higher-lying electronic level has a higher population than a lower-lying level". Encyclopedia of Laser Physics and Technology, www.rp-photonics If the desired frequency at which the phase of the interference modulates, which corresponds to the periodic change of the fiber length, is low, the inversion wave will be substantially in counter-phase with the interference (intensity) wave. In other words, the higher intensity, the lower the inversion, and vice versa.

However, increasing the frequency of the phase modulation of the interference wave changes the relationship between the inversion and intensity due to the inertia of the inversion. The phase of the interference wave, however, can be modulated instantaneously. As the frequency increases beyond a predetermined threshold, the inversion wave will average itself, i.e., the amplitude of the inversion wave would not be able to reach maximum or minimum, and thus, will be reduced. The higher the frequency, the smaller the amplitude of the inversion. The latter, in turn, affects a refractive index of medium $\Delta n$ which corresponds to a cross-coupling coefficient. Hence, the higher the phase modulation frequency of the interference wave, the lower the cross-coupling coefficient. Eventually, it is possible to increase the frequency of phase modulation so that the cross-coupling coefficient will be substantially suppressed. As a consequence, the fundamental mode can propagate along the MM fiber without being coupled to a high-order mode.

BRIEF DESCRIPTION OF THE DRAWINGS

The above and other features of the disclosure will become more readily apparent from the following specific description better understood in conjunction with the accompanying drawings, in which:

FIG. 1 is a diagrammatic view of the disclosed device and its operation.

FIG. 2 is a graph illustrating the dependence of the cross-coupling coefficient from a frequency of phase modulation.

FIG. 3 is a diagrammatic view schematically showing the results of the operation of the disclosed device.

FIG. 4 is a diagrammatic view of one of the embodiments of the piezo actuator configured in accordance with the disclosure.

FIG. 5 is a diagrammatic view of another embodiment of the disclosed piezo actuator.

FIG. 6 is a diagrammatic view of still another embodiment of the disclosed piezo actuator.

SPECIFIC DESCRIPTION

Figure 7:
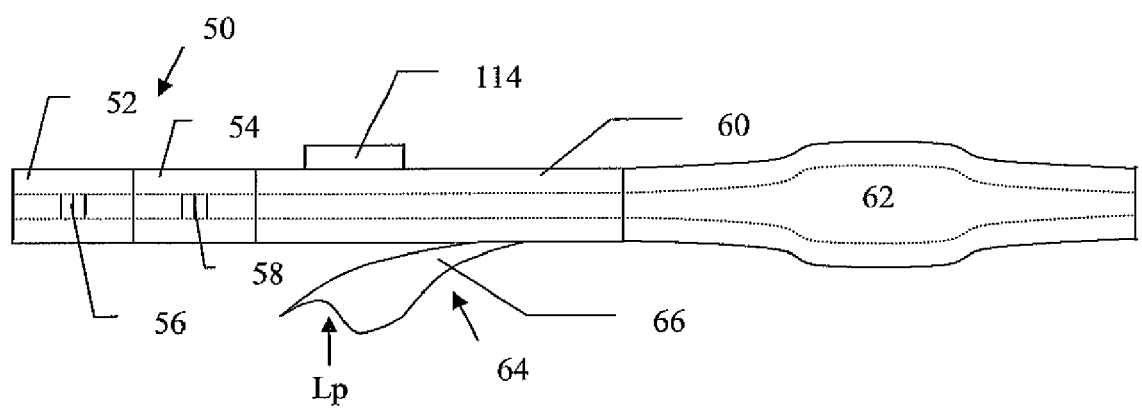
FIG. 7 illustrates an exemplary laser system configured with the disclosed device of FIG. 1.

Reference will now be made in detail to the disclosed device and method. Wherever possible, same or similar reference numerals are used in the drawings and the description to refer to the same or like parts or steps. The drawings are highly diagrammatic and are far from precise scale. While the following specific description continuously refers to the term "multimode active fiber", one of ordinary skills in the laser arts readily understands that the disclosed method is applicable to multimode passive fibers.

FIG. 1 illustrates a diagrammatic view of the disclosed system 110 configured in accordance with the disclosure. The laser system 110 includes, among others, a length of multimode active fiber (MMAF) 112, and an oscillator 114. The system 110 is configured to modulate the phase of an interference wave 124 so as to substantially eliminate the cross-coupling of fundamental and high-order modes without, however, sacrificing a significant portion of the power of the output beam (OB).

A input beam (IB), impinging upon an upstream end 118 of MMAF 112, splits into at least two modes: a fundamental mode $LP_{01}$ carrying the majority of the power which is contained in the IB, and at least one high-order mode $LP_{hm}$ containing a remaining, insignificant portion of the IB's power. Typically, as the modes propagate along the core of fiber 112, they are not only amplified by a gain medium, but they also tend to couple to one another. The coupling entails power losses in the fundamental mode as the amplified modes axially propagate along fiber 112.

To avoid the mode coupling and loss of power, oscillator 114, including a piezo actuator, oscillates at a frequency fpa in response to the applied voltage. Coupled, for example, to upstream end 118 of MMAF 112, piezo actuator 114 axially oscillates MMAF 112 so that its length periodically increases and decreases relative input end 118

As piezo actuator increases its length from L to L+δL, the original length of fiber 112 is also increased. Selecting an arbitrary point 130 along the MMAF before the downstream end of piezo actuator 114, it is easy to see that it shifts at δL to a point 130', whereas points remote from point 130, such as point 126, shift at a distance greater than δL. If the phase of interference wave 124 changes at 2π within the δL region, then the intensity I can fully change from min (O) to max (1) and back.

The intensity distribution is associated with the inversion process which is represented by a wave 128. The higher the inversion, the lower the intensity, and vice versa. However, in contrast to the intensity, the inversion is characterized by inertia, i.e., the inversion cannot be changed instantaneously.

If the oscillation frequency f of piezo-actuator 114 is selected lower than a threshold frequency $f_{th}$, inversion wave 128 will substantially follow the established pattern and has its peaks and nadirs substantially in counter-phase with respective points at interference wave 124. The threshold frequency $f_{th}$ here is the frequency of oscillation of piezo actuator 114 at which the amplitude of the inversion is substantially reduced. Once the oscillation frequency f reaches a threshold reference $f_{th}$, the inversion will not be able to preserve the initial pattern due to the inertia. In other words, piezo-actuator 114 is switched between its "on" and "off" states before the interference wave 128 may reach its maximum and minimum. Hence, the amplitude of inversion wave 128 decreases as oscillation frequency increases and, eventually, the amplitude of wave 128 reaches its average, as diagrammatically shown in FIG. 3.

The inversion, refractive index Δn and cross-coupling component k relate to one through multiple variables. See Emmanuel Desurvire et al. "EDFAs, Device and System Developments" p. 19, equation 1.50. However, in the nutshell, the lower the inversion, the lower the Δn, the smaller the cross-coupling coefficient k. The latter stems from the following:

$$k = \frac{\beta_0}{2} \cdot \int_A \psi_1 \cdot \Delta n \cdot \psi_2 \cdot dA$$

where k—cross-coupling coefficient between modes, $\beta_0$—propagation constant within vacuum, Δn—perturbed change of refractive index, and A—transversal cross-section. See Tim Birks et al. "The Acousto-Opti Effect in SM Fiber Tapers and Couplers" Journal of lightwave technology, Vol. 14, No. 11, November 1966, p. 2522, equation 17.

Accordingly, with the amplitude of inversion wave 128 decreasing, cross-coupling coefficient k becomes less and less of a factor.

FIG. 2 illustrates an example of the typical behavior of Yb doped fiber amplifier in which signals 132, 134 and 136, respectively, have respective threshold frequencies $f_{th}$. For a 10 W signal the threshold frequency is about 100 Hz, for a 100 W signal —1 KHz and for a 1000 W the threshold frequency is about 10 KHz. The higher the frequency, the greater the suppression.

FIG. 4 illustrates one of possible implementations of the above disclosed method. In particular, a series of piezo actuators 121, 121'... 121" synchronously operating along MMAF 112.

FIG. 5 shows another modification of actuator 114. In this case, MMAF 112 is wound about an elliptically shaped structure including a pair of spaced apart semicircular supports 138. The piezo actuator 114 bridges supports 138 and actuates fiber 112 wound around supports 138 at the desired frequency. The modification shown in FIG. 5 is more effective than that one of FIG. 4 because fiber 112 oscillates along lobes 140 of respective supports 138.

FIG. 6 illustrates still a further modification of piezo actuator 114 having a circular cross-sectional shape. The circular shape allows fiber MMAF 112 expands uniformly in all directions. Increasing the number of turns if fiber 112, it is possible to achieve very high frequencies of modulation of the output beam OB and substantially increase a threshold for such an undesirable nonlinear effect as stimulated Brillouin scattering.

Referring to FIGS. 4-6, to achieve the desired results, it is necessary to strip a silicon coating so as to expose the quartz. Otherwise, once extended, the silicone coating would not return back to the initial since it lacks resilience.

FIG. 7 illustrates an exemplary fiber laser system configured, for example, with a laser 50 disclosed in U.S. Pat. No. 5,774,484 owned in its entirety by the Assignor of the present disclosure, amplifier 60 and a delivery fiber 62 all spliced to one another. The amplifier 60 is configured in accordance with this disclosure and is provided with one or more piezo actuator. The linear configuration of the actuator is shown, but any of the modifications shown in FIGS. 5 and 6 can be used. The amplifier 60 may be pumped by a pump 64, emitting pump signal Lp and configured with a feeding fiber having a progressively tapered portion 66 which is fused to MMAF 60 at a region of the progressively tapered potion. See U.S. Pat. No. 5,999,673 owned in its entirety by the Assignor of the present disclosure.

The laser 50 comprises a MM upstream fiber 52 optically coupled at one end thereof to one end of a SM downstream fiber 54, and reflectors 56 and 58, respectively, which are incorporated with the fibers so as define an optical cavity. The reflectors 56 and 58 provided in respective MM fiber 52 and SM fiber 54 are so configured that a predetermined wavelength, MM fiber 52 radiates only one, fundamental mode. The core sizes of respective fibers 52 and 54 are chosen so that the fundamental mode diameter of MM fiber 52 substantially matches that one of SM fiber 54 and, of course, to that one of amplifier 60.

Considering that the output power of system 50 may reach tens of kW, a SM delivery fiber 62 is configured with a double-bottle-neck cross-sectional shape. The disclosed shape provides for reducing the environmental hazard.

It will be apparent to those skilled in the art that various modifications and variations can be made in the presently disclosed laser system. For example, the disclosed laser system can operate as a single frequency system, but can be equally effective operating in a multi-frequency mode. Thus, it is intended that the present disclosure cover the modifications and variations of this disclosure provided they come within the scope of the appended claims and their equivalents.

The invention claimed is:

1. A laser system comprising:
   a multimode fiber (MMF) having a core receiving an input beam split into at least one high order mode (HOM) and a fundamental mode (FM) in the core of the MMF, the modes interacting with one another to form an interference wave; and
   a piezo actuator coupled to the MMF operative to modulate a phase of the interference wave at a frequency sufficient to minimize a cross-coupling between the FM and at least one HOM in the core.

2. The laser system of claim 1, wherein the piezo actuator is configured so that the modulation of the phase having the frequency at which an inversion wave has a substantially decreased amplitude thereof.

3. The laser system of claim 1 further comprising a plurality of piezo actuators aligned with one another along and in contact with the MMF.

4. The laser system of claim 1, wherein the piezo-actuator bridges two spaced apart semicircular supports having respective lobes which face away from one another so that a length of the MMF is wound around the lobes and having a substantially elliptical cross-section.

5. A laser system comprising:
   a multimode fiber (MMF) receiving an input beam splitting into at least one high order mode (HOM) and a fundamental mode (FM) upon entering a core of the MMF, the modes interacting with one another to form an interference wave; and
   a piezo actuator coupled to the MMF operative to modulate a phase of the interference wave at a frequency sufficient to minimize a cross-coupling between the FM and at least one HOM; wherein the piezo-actuator has a circular cross-section, an annular periphery of the piezo-actuator supporting a plurality of turns of the MMF.

6. The laser system of claim 1, wherein the MMF is made from quartz covered by a silicon coating, a stretch of the MMF coupled to the piezo-actuator having the coating removed.

7. The laser system of claim 1, wherein the MMF has a core provided with a gain medium, which is doped with one or more rare-earth elements, and is configured as an optical amplifier having one of opposite ends thereof fused directly to a downstream end of a laser,
   the laser being configured with:
      an upstream MM fiber, capable of supporting substantially a single transverse mode at a wavelength, and
      a SM downstream fiber coupled directly to the SM fiber and having the downstream end directly coupled to the one end of the optical amplifier.

8. The laser system of claim 7, wherein the laser and amplifier have respective mode field diameters substantially equal to one another to provide substantially lossless coupling of the SM beam into the optical amplifier.

9. The laser system of claim 7 further comprising a SM delivery fiber coupled to the other end of the optical amplifier and receiving the fundamental mode, the SM delivery fiber having a double-neck cross-sectional shape.

10. The laser system of claim 7 further comprising a pump unit provided with a feeding fiber, the feeding fiber having a progressively tapered portion fused to the upstream MM fiber at a region of the progressively tapered potion.

11. A method of suppressing a cross-coupling coefficient between a fundamental mode (FM) and at least one high order mode in a core of a MM fiber (MMF), comprising:
    coupling a piezo-actuator to the MMF; and
    actuating the piezo-oscillator to oscillate the MMF so as to modulate a phase of the interference wave at a desired frequency sufficient to minimize a cross-coupling component between the FM and at least one HOM in the core.

12. The method of claim 11, wherein the oscillation of the MMF includes periodically increasing and decreasing a length of the MMF between a region of coupling between the piezo-actuator and a downstream end of the MMF, thereby modulating the phase of the interference wave.

13. A method of suppressing a cross-coupling coefficient between a fundamental mode (FM) and at least one high order mode in a core of a MM fiber (MMF), comprising:
    coupling a piezo-actuator to the MMF;
    actuating the piezo-oscillator to oscillate the MMF so as to modulate a phase of the interference wave at a desired frequency sufficient to minimize a cross-coupling component between the FM and at least one HOM in the core; and
    decreasing an amplitude of an inversion wave while modulating the phase of the interference wave at the desired frequency, wherein the decrease of the amplitude of the inversion wave minimizes the cross-coupling coefficient.

14. The method of claim 11 further comprising winding a stretch of the MMF around the piezo-actuator so that the wound stretch has an elliptical cross-section.

15. The method of claim 11 further comprising winding a plurality of turns of the MMF around the piezo-actuator so that the wound turns each have a circular cross-section.

16. The method of claim 11 further comprising coupling a plurality of consecutively positioned piezo actuators to an elongated stretch of the MMF.

* * * * *